No. 648,353. Patented Apr. 24, 1900.
G. CARLSON.
CONFECTIONERY MACHINE.
(Application filed Sept. 30, 1899.)
(No Model.) 10 Sheets—Sheet 1.

Witnesses: Inventor:
Gabriel Carlson
by Chapin & Co
Attorneys

No. 648,353. Patented Apr. 24, 1900.
G. CARLSON.
CONFECTIONERY MACHINE.
(Application filed Sept. 30, 1899.)

(No Model.) 10 Sheets—Sheet 2.

Witnesses:
John Garfield
H. D. Clemons

Inventor
Gabriel Carlson
by Chapin & Co
Attorneys

No. 648,353. Patented Apr. 24, 1900.
G. CARLSON.
CONFECTIONERY MACHINE.
(Application filed Sept. 30, 1899.)
(No Model.) 10 Sheets—Sheet 4.

Witnesses:
J. H. Garfield
K. J. Clemons

Inventor
Gabriel Carlson
by Chapin & Co
Attorneys

No. 648,353. Patented Apr. 24, 1900.
G. CARLSON.
CONFECTIONERY MACHINE.
(Application filed Sept. 30, 1899.)
(No Model.) 10 Sheets—Sheet 6.

No. 648,353. Patented Apr. 24, 1900.
G. CARLSON.
CONFECTIONERY MACHINE.
(Application filed Sept. 30, 1899.)
(No Model.) 10 Sheets—Sheet 7.

No. 648,353. Patented Apr. 24, 1900.
G. CARLSON.
CONFECTIONERY MACHINE.
(Application filed Sept. 30, 1899.)

(No Model.) 10 Sheets—Sheet 8.

No. 648,353. Patented Apr. 24, 1900.
G. CARLSON.
CONFECTIONERY MACHINE.
(Application filed Sept. 30, 1899.)
(No Model.) 10 Sheets—Sheet 9.
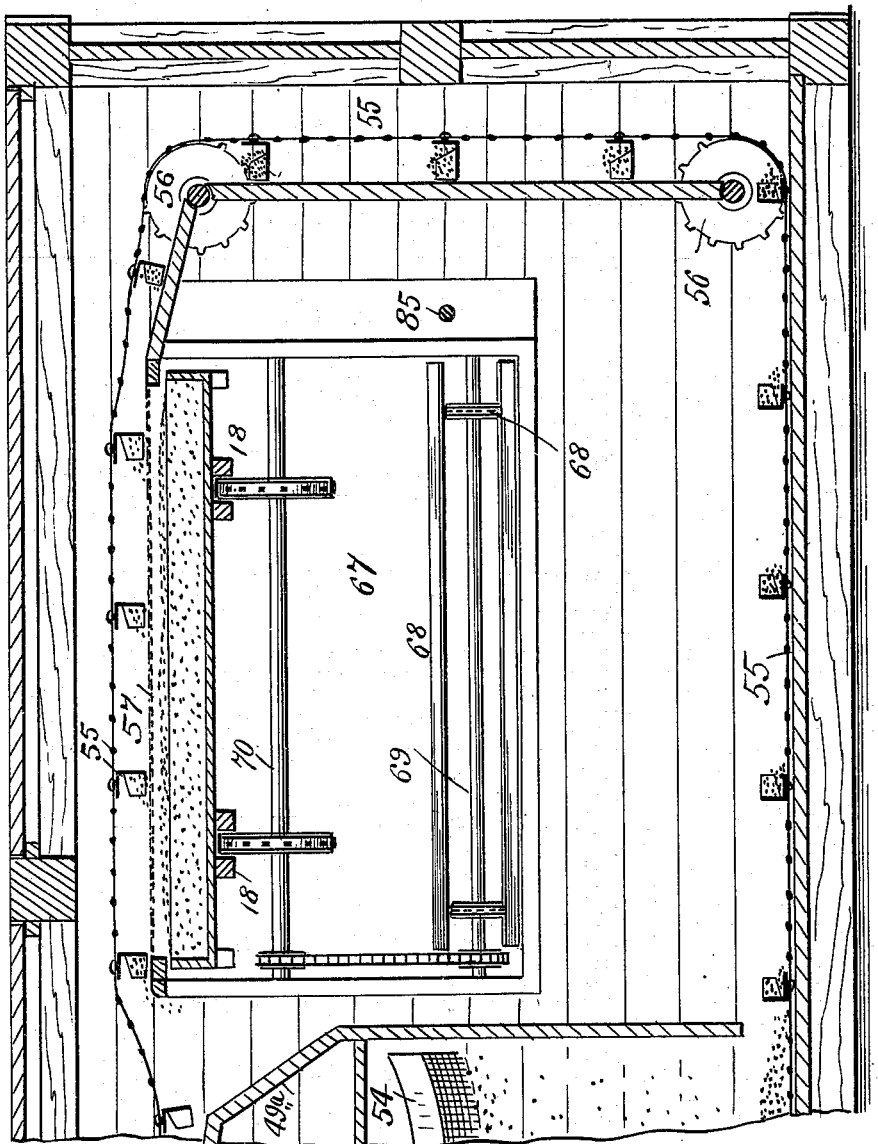
Fig. 9.
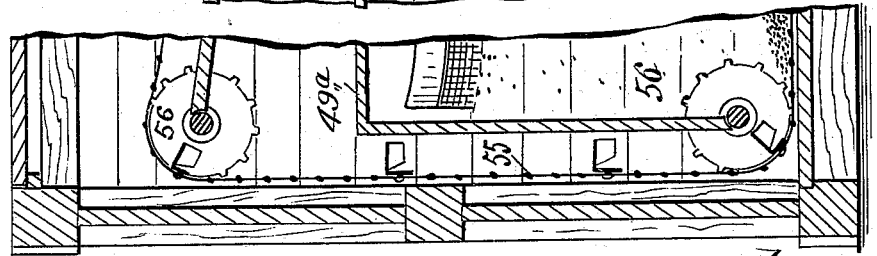
Witnesses:
J. D. Garfield
H. D. Clemons
Inventor,
Gabriel Carlson
by Chapin & Co
Attorneys.

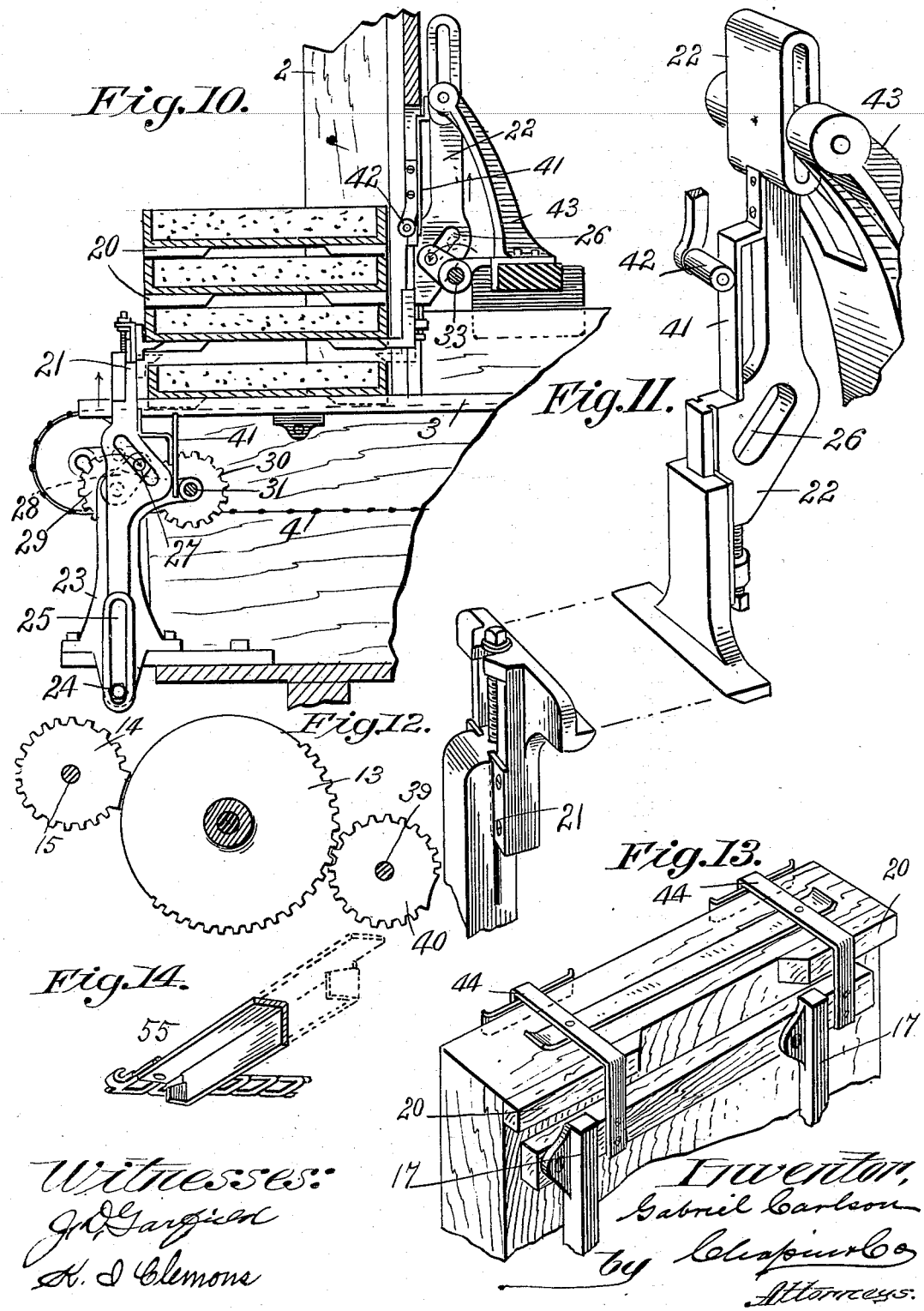

UNITED STATES PATENT OFFICE.

GABRIEL CARLSON, OF SPRINGFIELD, MASSACHUSETTS, ASSIGNOR TO THE CONFECTIONERS' MACHINERY AND MANUFACTURING COMPANY, OF SAME PLACE.

CONFECTIONERY-MACHINE.

SPECIFICATION forming part of Letters Patent No. 648,353, dated April 24, 1900.

Application filed September 30, 1899. Serial No. 732,180. (No model.)

*To all whom it may concern:*

Be it known that I, GABRIEL CARLSON, a citizen of the United States of America, residing at Springfield, in the county of Hampden and State of Massachusetts, have invented new and useful Improvements in Confectionery-Machines, of which the following is a specification.

This invention relates to confectionery machinery, and especially to "starch-printing" machines, so called, the object of the invention being the construction of a machine which will receive the trays used in said starch-machines (the printed molds of which trays contain confections) and automatically empty said trays, separate the starch from the confections, refill the trays with starch, and, after leveling the top of the latter, pass the trays under the mold-printing mechanism, where a new impression is made in the starch ready for the reception of other confections.

This invention consists in the construction of a machine for automatically performing the above-enumerated operations, all as fully described in the following specification and carefully pointed out in the claims.

Figure 1:
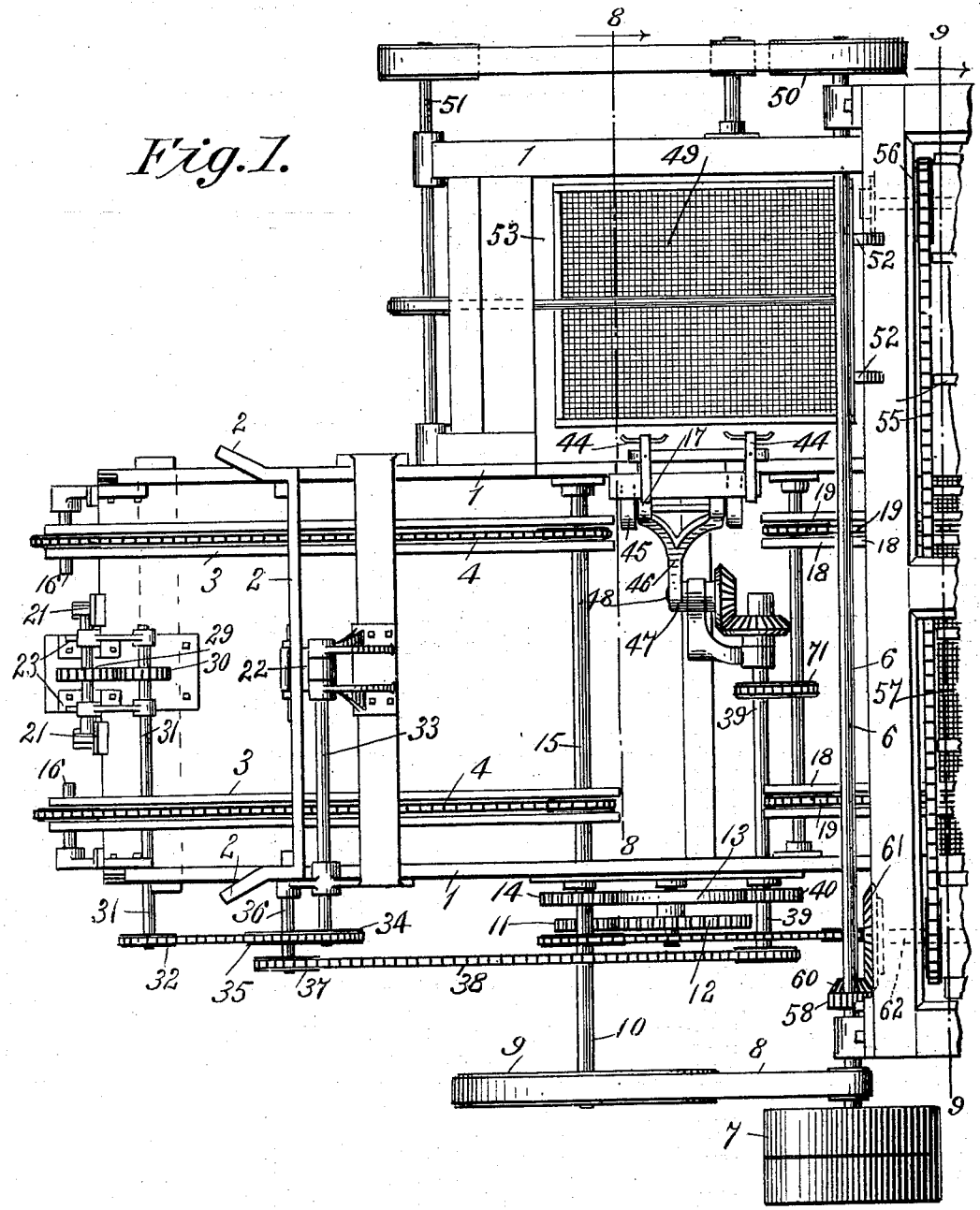
Figure 2:
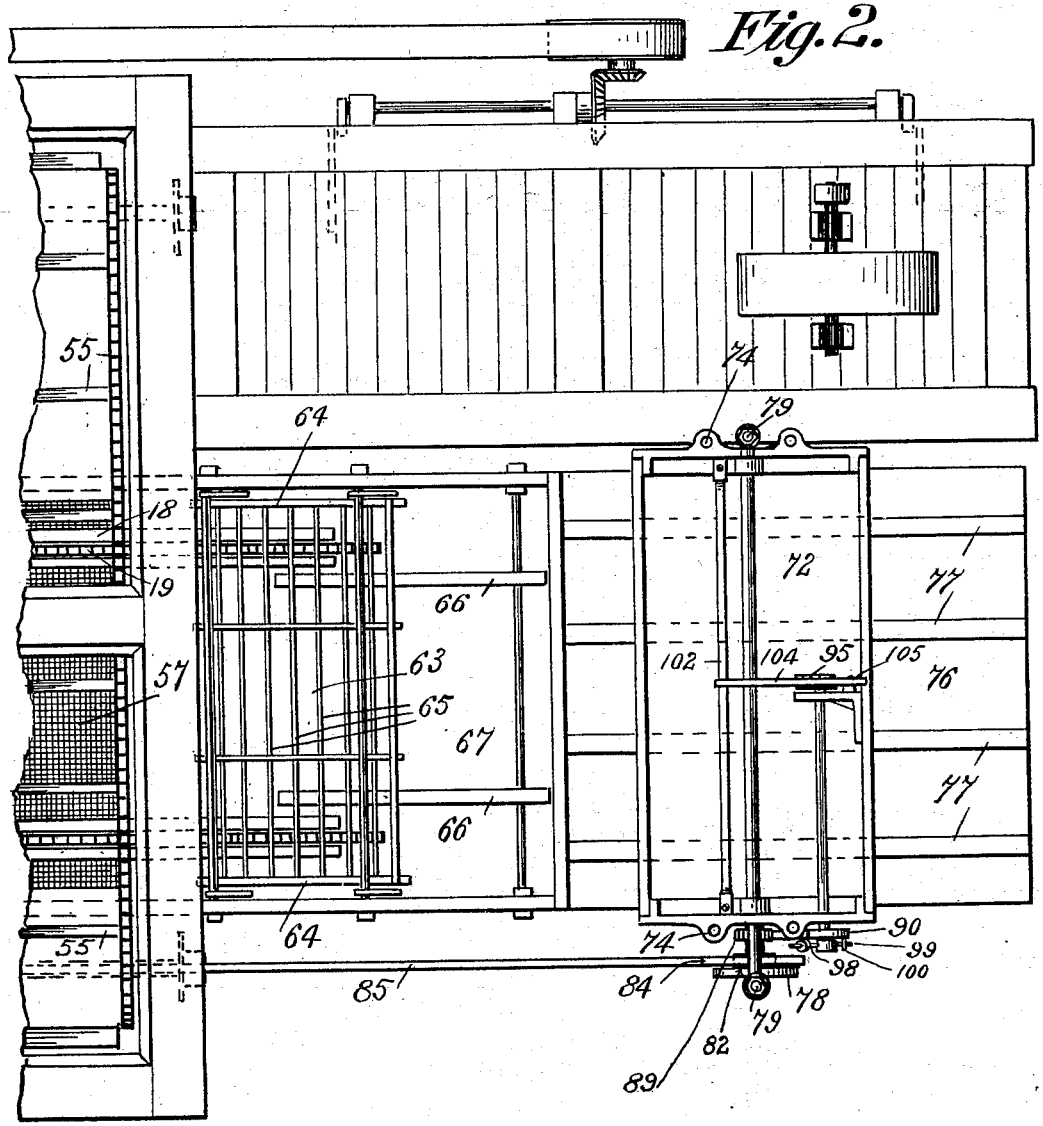
Figure 3:
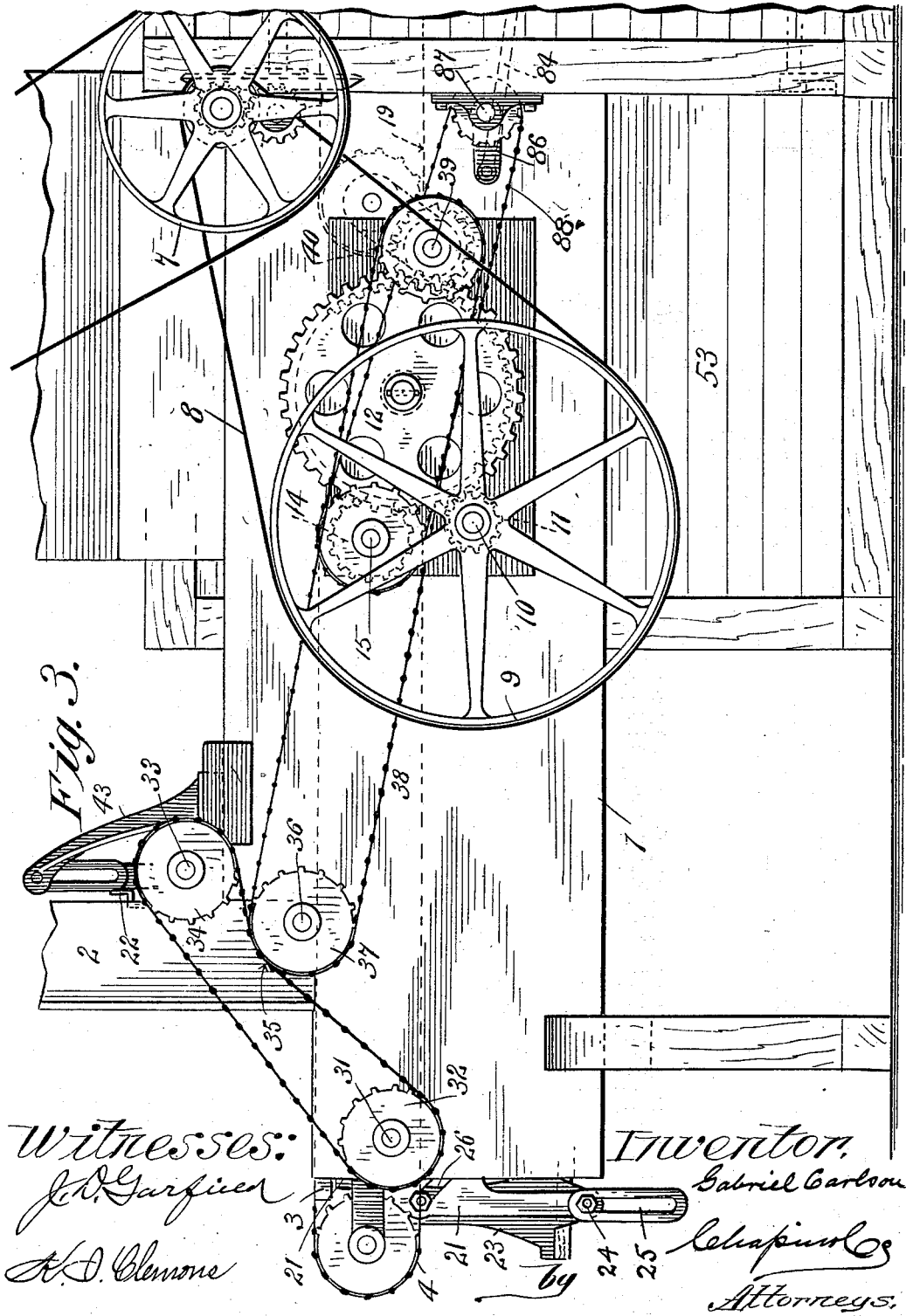
Figure 4:
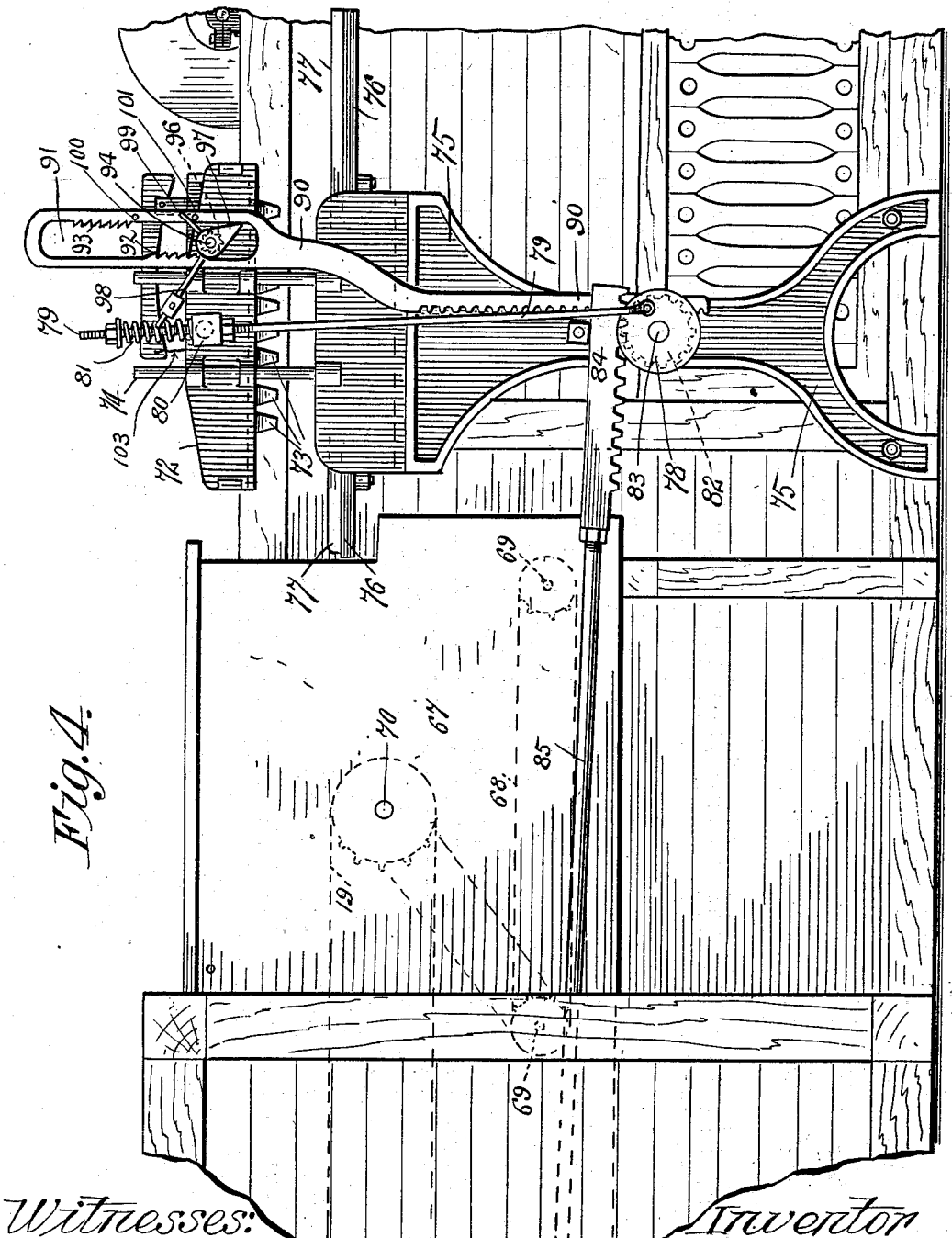
Figure 5:
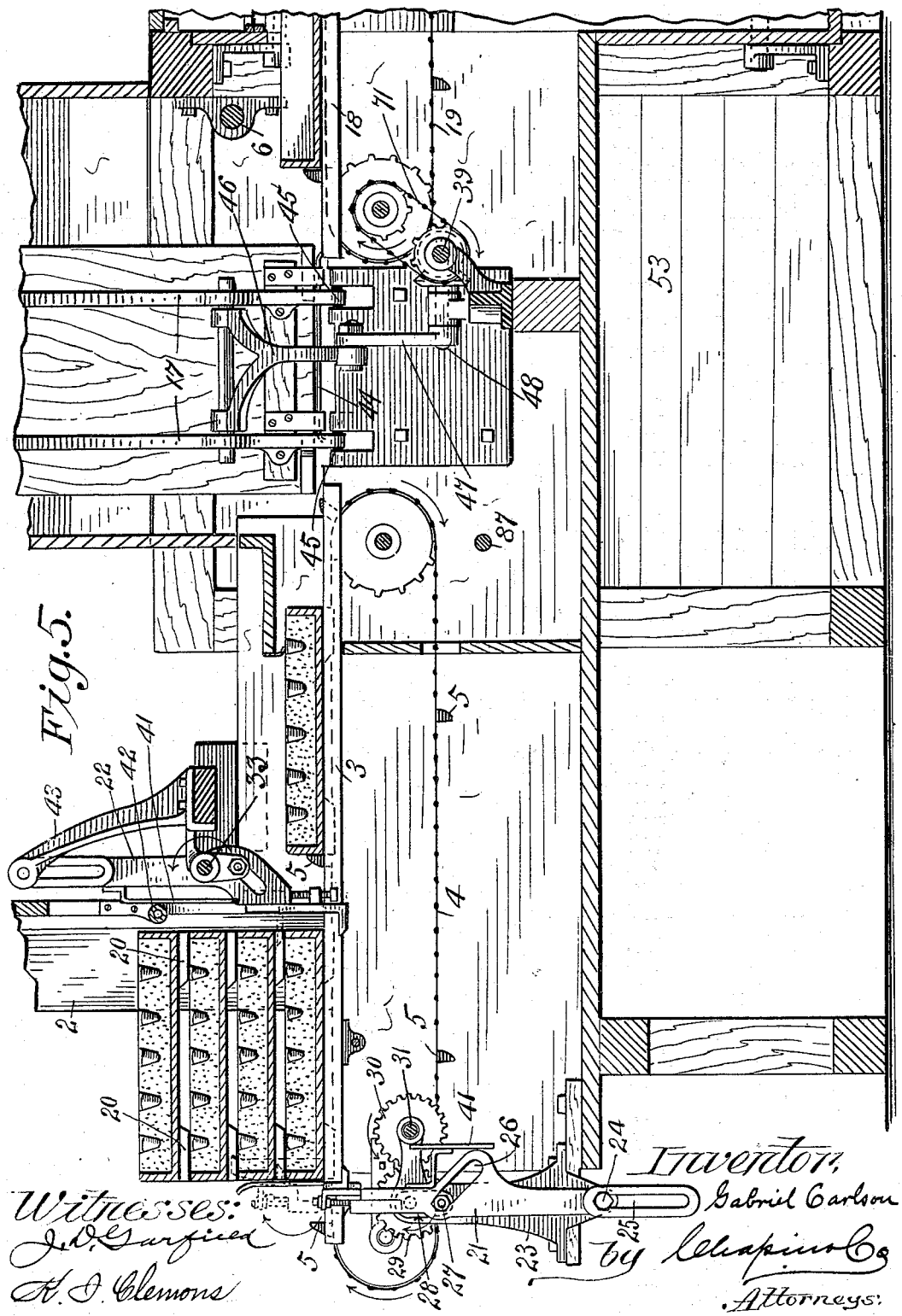
Figure 6:
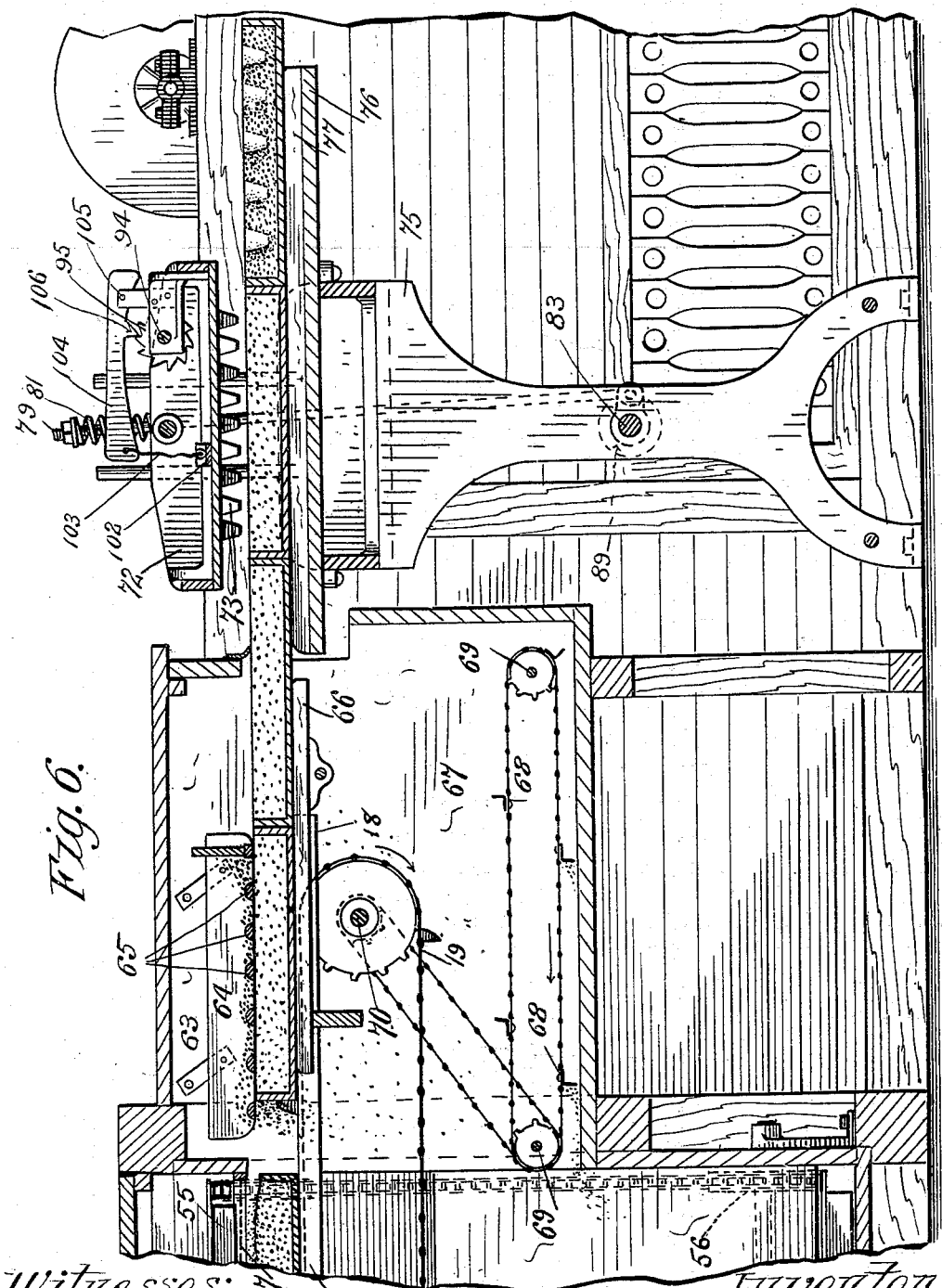
Figure 7:
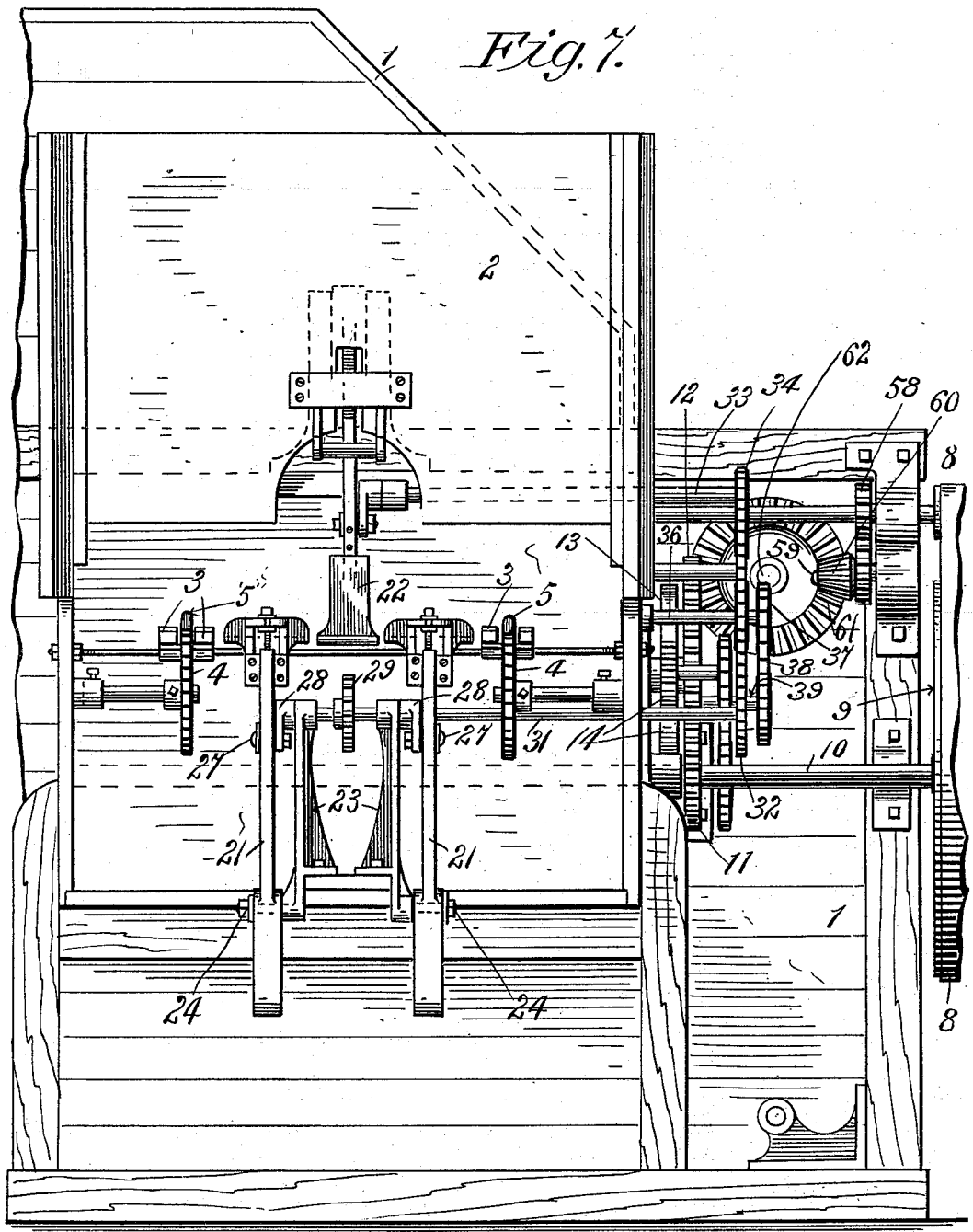
Figure 8:
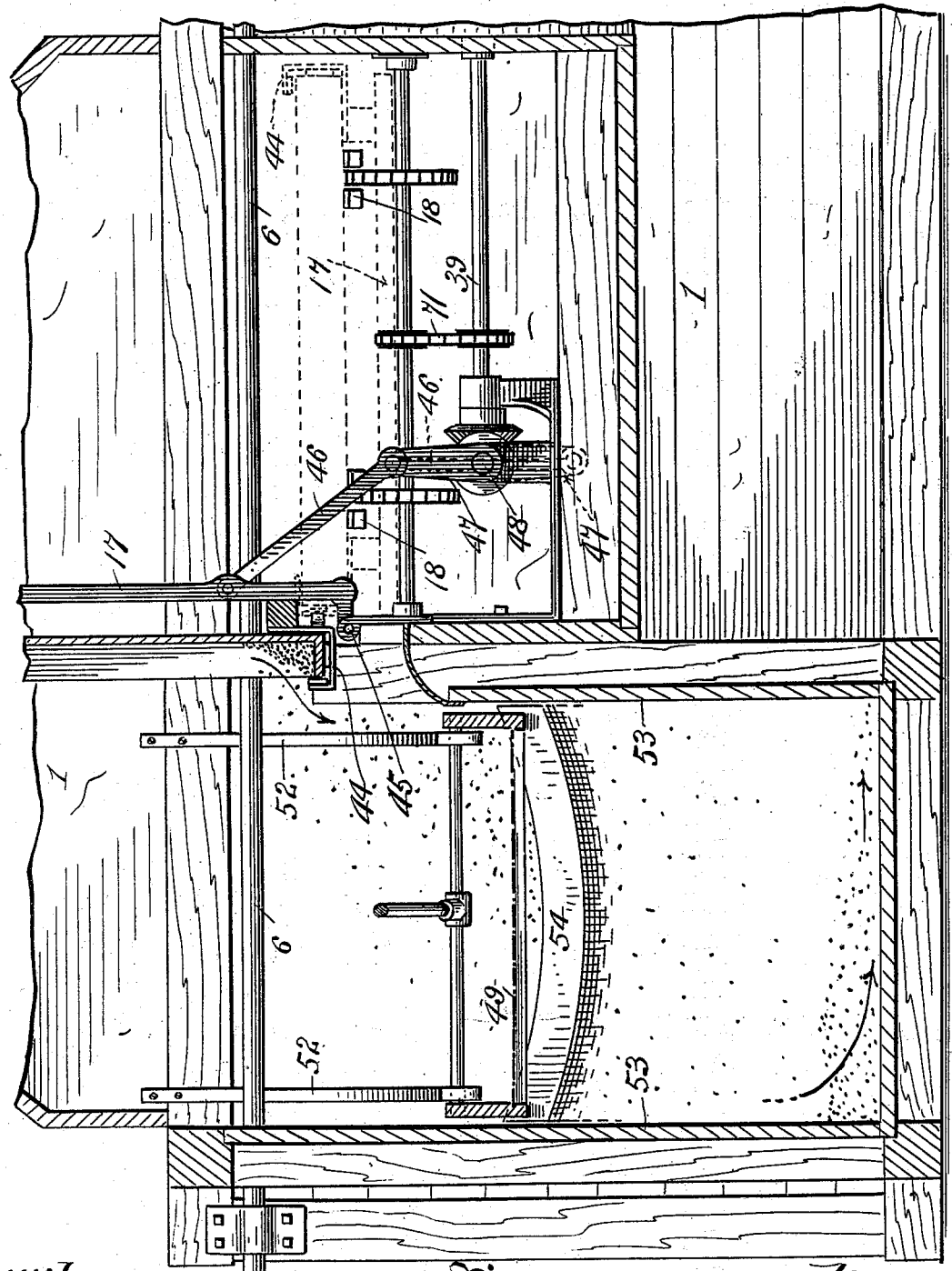

In the drawings forming part of this specification, Figure 1 is a plan view of the top of the forward end of the machine with the boxing removed. Fig. 2 is a plan view of the top of the rear end of the machine and, together with Fig. 1, comprises the complete machine. Fig. 3 is a side elevation of the front end of the machine. Fig. 4 is an elevation of the rear end of the machine viewed from the same side as in Fig. 3. Fig. 5 is a vertical longitudinal section through that part of the machine shown in Fig. 3. Fig. 6 is a similar section through that part of the machine shown in Fig. 4. Fig. 7 is an elevation of part of the front end of the machine. Fig. 8 is a transverse section on line 8 8, Fig. 1, looking in the direction of the arrow and showing the tray-emptying mechanism. Fig. 9 is a transverse section on line 9 9, Fig. 1, looking in the direction of the arrow. Fig. 10 is a sectional elevation of the forward end of the machine, showing devices for raising some of the trays to release the bottom one. Fig. 11 is a perspective view of the mechanism which engages the trays for lifting them off from the lower tray. Fig. 12 is a view of the broken gears which impart intermittent movements to the various parts of the machine. Fig. 13 is a perspective view of one end of a tray, showing a part of the frame by means of which the tray is reversed and emptied. Fig. 14 is a perspective view of a part of a bucket and its driving-chain, which carries starch to the trays to refill them.

In this machine the operations take place as follows: The trays are stacked up on the front end of the machine, and the pile is intermittently lifted to allow the lowest one to be moved by a conveyer-chain into the machine. It is run onto a frame, which reverses it endwise and empties its contents of starch and confections out onto a screen through which the starch drops, the confection running off the end of a screen, which is inclined for that purpose, the confections being brushed and the adhering starch-flow removed during their passage over the said screen. This part of the invention covering the screening and brushing process is covered by Letters Patent of the United States issued to me on October 16, 1894, and numbered 527,662, to which reference may be had for a full description thereof. After said trays have been overturned and emptied they are swung back again to proper position and carried by another conveyer belt or chain to a position under a screen, over which a line of bucket conveyers run and dump the starch thereon which has been removed from preceding trays. Here the trays are again filled with starch and then moved along under mechanism for leveling the top of the starch in the trays, which then pass on step by step, each one coming finally under the platen carrying the moldboard, which is forced down into the starch, forming the molds for receiving the plastic confection material. This brief description will facilitate the understanding of the detailed description of the machine, which will follow the steps of the above description as closely as possible.

Referring to Figs. 1, 3, and 7 of the drawings, which show the front end of the machine respectively in plan, side elevation, and end elevation, (the plan view being on a somewhat smaller scale than Figs. 3 and 7, which are uniform.) In said Fig. 1 the top of the casing of the machine is removed. The frame of the machine and this casing or boxing are indicated in the various figures by the numeral 1.

It is necessary to box in the entire machine on account of the dust arising from the emptying of the trays, the sifting of the starch, &c.

On the casing, at the front of the machine, a vertical frame 2 is erected, having outwardly-flaring sides, which frame provides for the proper vertical alinement of the boxes as they are piled one above the other and resting on the two pairs of rails 3, between each pair of which a chain conveyer 4 runs, having oppositely-placed lugs 5 thereon, (see Figs. 5 and 7,) adapted to engage the side of the box to move it into the machine. Intermittent movements are imparted to these chain conveyers 4 as follows: A main shaft 6 is located transversely of the machine and is driven by a belt running on the pulley 7, a second belt 8 running to a pulley 9 on the shaft 10, parallel with shaft 6. The shaft 10 extends also transversely of the machine (see Figs. 1 and 7) and has a pinion 11 thereon in mesh with the large gear 12, running loose on a stud-shaft supported on the casing. A large broken gear 13 (see Fig. 12) is secured to the hub of said gear 12 and engages a small broken gear 14 on the sprocket-shaft 15, extending across the machine, and on which the sprocket-wheels are located, over which the chain conveyers 4 run and by which they receive their intermittent movement, which is equal to the toothed part of the circumference of the said gear 14 and that is sufficient to carry a tray from the position under the stack of trays to that shown in Fig. 5. The sprockets on the front end of the machine, over which the chain conveyers 4 run, are supported on two studs 16 16. (See Figs. 1, 3, 5, 7, and 10.) The next succeeding movement of the chain conveyer 4 carries the tray over the reversing-frame 17, which in said Figs. 1 and 5 is shown in vertical position in the act of emptying a tray, and as the tray passes on to said frame 17 it passes off from the chain conveyer 4 and pushes the tray then in position on the frame off from it and on to rails 18, which are in line with the said rails 3, and between these rails 18 is another pair of conveyer-chains 19, having lugs thereon similar to the lugs 5 and similarly spaced, the movements of the chains 19 being so timed that the lugs on them will be out of the way when said tray is pushed onto the rails 18. The movements of these conveyer-chains 19 will be described at the proper time.

To permit the lower one of the pile of trays stacked up on the rails 3 to be moved by the chain conveyers 4, devices are provided for engaging the bottom of the tray next above the lower one and raising the trays above it to leave the lower tray free from the weight of the others. To permit the engagement of these devices with the trays, the latter are provided with cleats 20, (shown in Figs. 5, 10, and 13 of the drawings,) arranged along the bottom edges of the trays in position to rest on the upper edges of other trays when they are stacked up in a pile. These separate the bottom edge of one tray from the top of the one next below it and permit the introduction under the tray next to the bottom of the pile of the lips of the lifting-arms 21, which engage the front of the trays, and of the similar arm 22, which engages the rear side of the tray. These arms are similar in construction and action, the arm 22 on the back side of the trays being in an inverted position relative to the arm 21. Both the front and rear arms have simultaneous movements, which are imparted to them as follows: The arms 21 are supported on two standards 23, bolted to the machine at the front end thereof, at the base of which are two studs 24, engaging the slot 25 in the lower ends of the arms. In their lower positions the arms hang on these studs. (See Fig. 5.) Between the upper and lower ends of these arms are the inclined cam-slots 26, in which the wrist-pin 27 of a crank 28 engages. This crank is journaled near the top of the standards 23, and between the latter on said crank is a gear-wheel 29, in mesh with a second gear 30 on the shaft 31, journaled in two rearwardly-extending arms of the said standards 23. (Shown in Figs. 1, 5, and 10.) Said shaft 31 extends through the side of the machine, as shown in Figs. 1 and 7, and a sprocket-wheel 32 thereon by a suitable chain communicates rotary movements to the shaft 33, having the sprocket 34, on which said chain runs. Said shaft 33 operates the arm 22 in precisely the same manner that the shaft 31 operates the arms 21. Movement is imparted to both of the shafts 31 and 33 simultaneously by the engagement of the said chain with the sprocket 35, (see Fig. 3,) located between said shafts and over which the chain of the sprockets 32 and 34 runs in its movement around said sprockets. Said sprocket 35 is secured on a stud-shaft 36, located on the side of the machine and on which a sprocket 37 is secured, from which a chain 38 runs to a sprocket on the shaft 39. On the latter is a broken gear 40, similar to the gear 14 and so located as to be rotated while said gear 14 is at rest. This gear 40 is the driving-gear for the arms 21 and 22 through the connections just described and serves also, through the rotation of the shaft 39, to impart movements to the tray-reversing frame 17. Going back now to the operation of the arms 21 22, it will be seen that the rotation of the cranks 28 will be productive of two movements of the arms 22. First, starting from the position shown in Fig. 5, the cranks being at their lowest point, the movement of the cranks will swing the top of the arms 21 outward and upward in a half-circle and cause their lips to enter the space under the tray next above the lower tray, and this will leave said arms hanging on the wrist-pin of the cranks. A vertical plate 41 is carried by each of the arms 21, which plate bears on the shaft 31. When the cranks arrive at their highest position, their continued rotation cannot swing the arms 21 farther toward the trays, because of the bearing of this plate 41 against said shaft, and hence the tendency of said continued movement of the cranks will be to carry said arms upward by the action of the wrist-pins forced against the top of the inclined slots 26. This movement raises all of the trays off from the lower one, and at this time the chain conveyers 4 are operated to move said bottom tray on into the machine. The continued movement of the cranks then allows the pile of trays to move down, following the downward movement of the arms 21 until they again rest on the rails 3, the arms continuing their descent some distance below the level of the bottom box to the position from which they started, as shown in Fig. 5. The elevated position of the arms before said camming action begins is shown in dotted lines in Fig. 5, and the extreme position to which the arms are elevated by the cam action above this point is shown in full lines in Fig. 10. In this last-named figure is also shown a stud 42, which serves the same purpose as the shaft 31 for the plate 41 to bear against, the arm 22 being supported on a standard 43, bolted to a transverse member of the frame. The tray-engaging ends of the arms 21 and 22 are made adjustable, as shown in Fig. 10, to permit their close adjustment to the trays.

The movements of the trays all the way through the machine are step-by-step movements, and the tray is first moved from the bottom of the pile to the position shown in Fig. 5. The next movement of the chain brings it in position in the reversing-frame 17, which position is shown in dotted lines in Fig. 8, the frame being shown in full lines in a vertical position therein. The said frame 17 is rectangular in form and provided with clips 44 for engaging the ends of the trays to retain them on the frame when the latter is reversed. This frame is hinged to the machine at 45, and a yoke 46 is pivotally connected to the under side of the frame and to the end of a crank 47 on the extremity of the short stud 48, whose opposite end is by bevel-gears connected with the shaft 39. The latter, as has been explained, is driven by the broken gear 40 intermittently and is actuated while the tray-moving mechanism actuated by the broken gear 14 is at rest, and one movement of said gear is sufficient to rotate the crank 47 once, which will through the yoke connection 46 move the tray in said reversing-frame 17 from the dotted position (shown in Fig. 8) to a position a little past the vertical and empty the contents thereof onto the screen 49. This screen has a shaking movement imparted to it through the main shaft 6, a pulley 50 on the end of which drives, through a suitable belt, a shaft 51, which is provided with an eccentric, with which a rod engages, which is attached to the screen, (see Figs. 1 and 8,) which is hung for a swinging motion on two spring-arms 52. The confections are here brushed and cleansed, as described in my above-referred-to Letters Patent, the starch going through the screen and falling to the bottom of the screen-box 53 and the confections out of a spout at the end of the screen.

Next beyond that part of the machine in which the reversing-frame 17 swings is a compartment. (Shown in Fig. 9 in a vertical sectional view taken across the machine and looking toward the delivery end thereof.) The chute 54 (shown in Fig. 9) enters this compartment from the screening-compartment, (shown in Fig. 8,) but the screen 49 does not. The chute carries the starch which has passed through the screen 49 to a point in the compartment shown in Fig. 9, which permits the starch to be gathered up by conveyer mechanism and carried up to fill empty trays. The chute 54 where it runs under the said conveyer mechanism is covered by a boxing 49ª. Chain bucket conveyers 55 run over sprockets 56, located in each corner of this compartment, and are adapted to run through the starch dropped from the chute 54 and convey it up over a screen 57, in passing over which the buckets are inverted and across the surface of which screen the buckets are drawn, thus aiding in effecting the passage of the starch through said screen. Part of one of the buckets and a portion of one of the chains are shown in perspective in Fig. 14. The rails 18 extend under this screen, and the tray just emptied by the frame 17 is pushed by the succeeding tray into position under this screen, where it is again filled with starch.

Movement is imparted to the bucket conveyers 55 by a gear 58 (shown in Figs. 1 and 7) on the shaft 6, meshing with another gear on a stud 59, on which is a bevel-gear 60, meshing with a larger one 61 on the end of the shaft 62, which extends back into the compartment in which the chain-buckets run. On this shaft is located one of the sprockets 56, over which the chain-buckets run. The shaft and bevel-gear connections and gear connections with the shaft 6 are shown clearly in Fig. 7.

It should be stated that the chains on which the buckets are secured are two in number, one secured to each end of the latter, the shafts on which are the sprockets 56, extending across the compartment. One end of these chain-buckets is shown in Fig. 1 and the opposite end in Figs. 2 and 6.

The tray is carried out from under the screen 57, where it dwells long enough to be filled with starch, which is heaped up above the level of the tray, as seen in Fig. 6, owing to the screen 57 being located some distance above the tray, and the latter next passes under the leveling-frame 63, whereby the starch is scraped off level with the top of the tray. This frame is shown in cross-section in Fig. 6 and in plan view in Fig. 2, and consists of two end boards 64, having the strips 65 secured between them. These are flat on the under side and rounded on top, thus providing an edge suitable for the purpose for which they are employed. At the end of this leveling-frame a smoothing-board extends between the two end boards 64, parallel with the strips 65, which gives a smooth finish to the surface of the starch and acts as a scraper, against which a part of the starch removed from the top of the tray accumulates as the box moves under the frame. From this point onward the trays are moved along by the contact of the one passing out from under the frame 63 with that one just preceding it, the conveyer-chain 19 turning back toward the reversing-frame 17 at a point just under the frame 63. Two short rails 66 are provided at this point and overlap the ends of the rails 18 and receive the tray before it leaves the latter. These rails extend far enough toward the delivering end of the machine to carry the trays onto the table on which they rest while subjected to the action of the mechanism which imprints the mold-forms in the starch. These forms are then filled again with plastic or liquid confection material, and the trays, after the confections have solidified, are again carried to the front end of the machine and sent through it, as described.

The leveling-frame 63, above described, is located in a compartment 67 of the machine adjoining that in which the chain-bucket conveyers 55 refill the trays and opens into this compartment, as shown in Figs. 6 and 9. The floor of the compartment 67 is higher than that of the larger compartment into which it opens, and all the starch scraped off from the top of the trays in the compartment 67 is (by means of the horizontal chain-scrapers 68, which run along the floor contrary to the course of the trays through the machine) thrown back into the larger compartment in which the buckets 55 run. The scrapers 68 run over two shafts 69, located one in each end of the compartment 67 and provided with sprockets with which the chain engages. One of these shafts receives motion by means of a driving-chain running thereto from the shaft 70, on which the conveyer-chain 19 is supported. (See Fig. 6.) Said chain 19 receives its movements from the intermittently-rotating shaft 39 by means of a sprocket-and-chain connection 71. (Shown in Figs. 1, 5, and 8.)

The platen 72, carrying the pattern-forms 73, has a vertical reciprocatory movement on the guide-pins 74, located at each end thereof and supported in the standards 75. The top of the latter is provided with a substantial platform 76, having thereon the strips 77, running lengthwise of the machine, on which the trays slide freely. (All illustrated in Figs. 2 and 4.) Movements are imparted to said platen by a crank-disk 78 on each end of a shaft extending between said standards and a connecting-arm 79, extending from said crank-disks up through a swiveled stud 80 on the platen, said arm being provided with a nut below said stud, to the end that the lifting movement of the platen may be positive. A spiral spring 81 is placed on the upper end of the arm, bearing on the stud 80, and a nut bears on the top of said spring, whereby on the downward movement of the platen the patterns may be forced into the starch to impress the mold-forms therein under a yielding pressure.

Intermittent rotary movement is imparted to the crank-disk 78 by means of a gear 82, located on the shaft 83, carrying said disk, (the latter being shown only in dotted lines in Fig. 4,) with which a rack 84 on the end of a rod 85 engages. Said rod extends back through the machine (being shown in section in Figs. 5 and 9) to a crank 86 on a shaft 87, (see Fig. 3,) which in turn receives intermittent rotary movements by a sprocket-chain connection 88, running to the shaft 15, which is intermittently rotated by the broken gear 14.

While reference has been made herein to starch only as the material in which the mold-forms are impressed, it is obvious that any other suitable material may be substituted therefor. The term "starch-molds" or "starch-machines" is a trade term used to designate that type of machine in which confections are formed by pouring semiliquid material into molds formed in a body of starch.

Mechanism for rapping the platen 72 to keep the pattern-board free from particles of starch which may adhere to it as it is raised after having been forced into the starch is provided as follows: A gear 89 is fixed on the shaft 83, and one revolution of the shaft 87 (see Fig. 3) imparts backward and forward rotation to the shaft 83 through the rack 84 and gear 82 referred to. A rack-bar 90 is suitably supported on the standard 75 for engagement with the gear 89 and the reciprocatory revolutions of the latter impart reciprocatory vertical movements to said rack-bar. The upper end of the latter is provided with a wide slot 91, on each side of which are ratchet-teeth 92 and 93, pitched in opposite directions. A shaft 94 is supported on the top of the platen 72, the inner end of which lies practically midway between the ends of the platen and has fixed thereon a star-wheel or ratchet-wheel 95. The outer end of the shaft is provided with another ratchet 96, which lies within the slot 91 in position to be engaged alternately by the ratchet-teeth 92 and 93 upon the upward and downward movements of the rack-bar 90. The latter is so supported that its upper end may swing slightly to bring alternately the said ratchet-teeth in the slot 91 into engagement with the opposite sides of the ratchet-wheel 96. This swinging movement is accomplished by means of a short wedge-shaped arm 97, loosely supported on the end of said shaft 94 next to the ratchet-wheel 96. Said arm is provided with two short arms 98 and 99, inclined away from each other. The arm 98 is weighted and adapted to normally hold the end of said wedge-shaped arm 97 against the side of the slot 91, as shown in Fig. 4. The arm 99 is adapted to be engaged by the pins 100 and 101, located in that side of the rack-bar 90 nearest to it. The bearing of the point of the arm 97 against the side of the slot 91 in said rack-bar, as shown in Fig. 4, will swing the latter slightly in its support, so that the ratchet-teeth 92 will, upon the downward movement of the bar, engage the ratchet-wheel 96 and rotate it, and by the time the bar has reached the lowest point of its downward movement the pin 100 will have engaged the arm 99 and swung the arm 97 over, so that its point will bear against the opposite side of the slot 91 and swing the rack-bar in the opposite direction, whereby the ratchet-teeth 93 will, on the upward movement of the bar, engage the ratchet-wheel 96 on the opposite side, thus rotating the shaft 94 again in the same direction as was imparted to it on the downward movement of the bar. As the latter moves upward the pin 101 engages the arm 99 and swings the rack-bar again back to the position shown in Fig. 4. Each time the arm 97 is swung by the pins 100 and 101 the weighted arm 98 swings over the center of the shaft 94, and said weighted arm 98 thus holds the rack-bar in engagement with the said ratchet-wheel 96 in engagement with the ratchet-teeth on either side of the slot 91.

A thin spring slat or bar 102 (see Fig. 6) extends from one end of the platen to the other and is attached thereto by its extremities and lies close to the surface thereof and is adapted to be lifted away from said surface and permitted to snap back against it by means of a flexible connection 103, attached to said slat or bar near its center and to the end of a lever 104, pivotally supported at its opposite end on the platen at the point 105. Said lever 104 passes over and close to the periphery of the ratchet or star wheel 95 and is provided with a tooth 106, adapted to engage the teeth of said ratchet or star wheel. The teeth of said star-wheel are of such height that when the tooth on the lever 104 lies between two of the teeth of the said wheel the flexible connection 103 will be slack, but in passing over the top of the tooth said connection is tightened up and raises the slat or bar 102 and lets it snap back onto the platen as each tooth of the star-wheel passes under the tooth of the lever 104.

Having thus described my invention, what I claim, and desire to secure by Letters Patent of the United States, is—

1. In a confectionery-machine, devices for receiving and moving through the machine trays containing confectionery in molds formed in suitable material, mechanism for, successively, emptying said trays, for refilling them with material adapted to receive mold-forms and for impressing said mold-forms in said material, substantially as described.

2. In a confectionery-machine, devices for receiving and moving through the machine a tray containing confectionery in molds formed in suitable material; mechanism adapted to automatically empty said tray, refill it with material adapted to receive mold-forms therein, and to impress said mold-forms in said material, substantially as described.

3. In a confectionery-machine, devices for receiving and moving through the machine with a step-by-step movement, a tray containing confectionery in molds formed in suitable material; mechanism for emptying said tray, for refilling it with material adapted to receive mold-forms, and for impressing said mold-forms in said material, substantially as described.

4. In a confectionery-machine, devices for receiving and moving through the machine with a step-by-step movement, a tray containing confectionery in molds formed in suitable material, combined with mechanisms operating between the successive steps of the tray, for emptying the latter, for refilling it with material adapted to receive mold-forms, and for impressing said mold-forms in said material, substantially as described.

5. In a machine of the class described, devices for moving through the machine trays containing confectionery in molds formed in suitable material; mechanism for successively and automatically emptying said trays, for refilling them with material adapted to receive mold-forms, and for impressing said mold-forms in said material, combined with a screen for receiving the contents of said trays when emptied, and adapted to separate the confectionery from the material in which it is molded, substantially as described.

6. In a machine of the class described, a support for receiving a pile of trays, mechanism for intermittently moving into the machine the lower tray of said pile, and for raising the other trays away from said lower one during the removal of the latter, substantially as described.

7. In a machine of the class described, a support for receiving a pile of trays, mechanism for intermittently moving into the machine the lower one of said trays, and for relieving it of the weight of the other trays, during its said removal, substantially as described.

8. In a machine of the class described, a support for receiving a pile of trays, mechanism for intermittently moving into the machine the lower tray of said pile and for raising the other trays away from said lower one during the removal of the latter, comprising arms for engaging opposite sides of the tray next above the bottom tray and adapted to lift it during the removal of said bottom tray and then to lower it onto said support, substantially as described.

9. In a machine of the class described, mechanism for moving, step by step, trays containing confectionery in molds formed in suitable material; a screening device lying one side of the line of movement of said trays through the machine, and mechanism operated between two successive steps of said trays and adapted to move each of the latter out of its normal line of movement, reverse it over the screening devices, and return it again to its normal position, substantially as described.

10. In a machine of the class described, mechanism for moving step by step trays containing confectionery in molds formed in suitable material; a screening device lying one side of the line of movement of said trays through the machine, and mechanism operated between two successive steps of said trays and adapted to move each of the latter out of its normal line of movement, reverse it over the screening devices, and return it again to its normal position, combined with conveyer mechanism adapted to remove said mold-receiving material from below said screen and deposit it in the emptied trays during an interval between two steps of the machine, following the tray-emptying interval, substantially as described.

11. In a machine of the class described, means for moving a tray step by step through the machine consisting of two series of conveyer-chains alternately actuated; tray-emptying mechanism located between the contiguous ends of said chains, one of the latter being adapted to deliver said tray on said emptying mechanism and thence onto the other of said conveyer-chains during the period of rest of the latter, substantially as described.

12. In a machine of the class described, the following coöperating mechanism, namely, for moving intermittently a series of trays through the machine; for emptying said trays; for screening the material contained therein; for refilling said emptied trays with material removed therefrom; for leveling said material in the trays; and for impressing mold-forms in said material, substantially as described.

13. The combination, in a machine of the class described, of tray-emptying and tray-refilling devices, with a mold-carrying member adapted to form mold impressions in the material contained in said refilled trays, substantially as described.

GABRIEL CARLSON.

Witnesses:
WM. H. CHAPIN,
K. I. CLEMONS.